(12) United States Patent
Sakai et al.

(10) Patent No.: US 12,404,172 B2
(45) Date of Patent: Sep. 2, 2025

(54) HYDROGEN CHLORIDE DEHYDRATION METHOD

(71) Applicant: TOKUYAMA CORPORATION, Yamaguchi (JP)

(72) Inventors: Junya Sakai, Yamaguchi (JP); Shoji Iiyama, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 517 days.

(21) Appl. No.: 17/771,532

(22) PCT Filed: Sep. 4, 2020

(86) PCT No.: PCT/JP2020/033526
§ 371 (c)(1),
(2) Date: Apr. 25, 2022

(87) PCT Pub. No.: WO2021/095329
PCT Pub. Date: May 20, 2021

(65) Prior Publication Data
US 2022/0371886 A1 Nov. 24, 2022

(30) Foreign Application Priority Data
Nov. 13, 2019 (JP) .................. 2019-205560

(51) Int. Cl.
*C01B 7/07* (2006.01)
*B01D 53/26* (2006.01)
*C01B 33/107* (2006.01)

(52) U.S. Cl.
CPC ............ *C01B 7/0706* (2013.01); *B01D 53/26* (2013.01); *C01B 33/10763* (2013.01); *B01D 2257/30* (2013.01)

(58) Field of Classification Search
CPC ............ C01B 7/0706; C01B 33/10763; C01B 33/10757; C01B 7/07; C01B 33/107;
(Continued)

(56) References Cited

U.S. PATENT DOCUMENTS 4,003,723 A * 1/1977 Schafer .................... C01B 7/01
423/240 R
4,227,890 A 10/1980 Wood et al.
(Continued)

FOREIGN PATENT DOCUMENTS

CN 202265420 6/2012
CN 202265420 U * 6/2012
(Continued)

OTHER PUBLICATIONS

Machine translation of CN202265420U (Year: 2012).*
(Continued)

*Primary Examiner* — Sally A Merkling
*Assistant Examiner* — Logan Edward Laclair
(74) *Attorney, Agent, or Firm* — Casimir Jones, S.C.; Robert A. Goetz

(57) ABSTRACT

A dehydration method in accordance with an embodiment of the present invention includes: a first dehydration step of bringing hydrogen chloride gas (21) and concentrated sulfuric acid (13A) into contact with each other; and a second dehydration step of bringing hydrogen chloride gas (21A) that has been obtained through the first dehydration step into contact with concentrated sulfuric acid (13B). A concentration of the concentrated sulfuric acid used in the second dehydration step is higher than a concentration of the concentrated sulfuric acid used in the first dehydration step.

4 Claims, 3 Drawing Sheets

(58) Field of Classification Search
CPC ......... C01B 7/01; C01B 7/0718; C01B 17/90; C01B 7/0731; B01D 53/26; B01D 2257/30; B01D 2251/506; B01D 2252/10; B01D 2256/26; B01D 53/263; B01D 53/28; B01D 2257/80; B01D 2257/2045; B01D 53/261; B01D 2251/60; B01D 53/1493; B01D 2257/2025; B01D 53/78; B01D 2257/2064; C01P 2006/80
See application file for complete search history.

(56) References Cited

U.S. PATENT DOCUMENTS

| | | | |
|---|---|---|---|
| 5,378,411 | A | 1/1995 | Iwaki et al. |
| 9,533,279 | B2 * | 1/2017 | Tachino ............... B01J 19/0053 |
| 2004/0059172 | A1 * | 3/2004 | Smith, Jr. ................. C07C 7/04 |
| | | | 585/712 |
| 2008/0029404 | A1 | 2/2008 | Weber et al. |

FOREIGN PATENT DOCUMENTS

| | | |
|---|---|---|
| CN | 102530873 A | 7/2012 |
| CN | 106955567 A | 7/2017 |
| JP | 03-177301 | 8/1991 |
| JP | 6-24730 | 4/1994 |
| JP | 6-171907 | 6/1994 |
| JP | 2003-1048 | 1/2003 |
| JP | 2003-181235 | 7/2003 |
| JP | 2006-502282 | 1/2006 |
| JP | 2007-269679 | 10/2007 |
| JP | 2009-537430 | 10/2009 |
| JP | 2011-168443 | 9/2011 |
| JP | 2012-46363 | 3/2012 |
| KR | 1995-0011825 | 10/1995 |

OTHER PUBLICATIONS

Office Action for CN 202080071806.3. Aug. 30, 2023. 16 pages.
International Preliminary Report on Patentability for PCT/JP2020/033526, mailed Nov. 2, 2020, 5 pages.
International Search Report for PCT/JP2020/033526 and its English translation, mailed Nov. 2, 2020, 6 pages.
Office Action for KR Patent Application No. 10-2022-7012121, dated Jul. 3, 2025, 6 English pages.

* cited by examiner

HYDROGEN CHLORIDE DEHYDRATION METHOD

TECHNICAL FIELD

The present invention relates to a method for dehydrating hydrogen chloride gas.

BACKGROUND ART

Conventionally, an adsorption method, a cooling condensation method, a concentrated sulfuric acid method, and the like have been used as a method for removing water from hydrogen chloride gas. In the concentrated sulfuric acid method, among these methods, a concentration of concentrated sulfuric acid used for dehydration and a water concentration of hydrogen chloride after the dehydration are in a trade-off relationship. That is, in a case where hydrogen chloride gas having a high water concentration is treated or in a case where a large amount of hydrogen chloride gas having a high water concentration is treated, the concentration of water contained in the obtained hydrogen chloride gas increases with decrease in concentration of concentrated sulfuric acid. Thus, for example, Patent Literature 1 describes a method in which water in hydrogen chloride gas is condensed by a cooling condensation method, and then the hydrogen chloride gas having a decreased water concentration is further dehydrated by using a concentrated sulfuric acid drying column.

CITATION LIST

Patent Literature

[Patent Literature 1]
Chinese Utility Model Publication No. 202265420 (Registered on Jun. 6, 2012)

SUMMARY OF INVENTION

Technical Problem

In a case where dehydration is carried out by a concentrated sulfuric acid method, a large amount of high-concentration concentrated sulfuric acid is often used to increase the certainty of dehydration of the obtained hydrogen chloride gas. Thus, improvement in efficiency in utilizing concentrated sulfuric acid is a very important problem from a cost and treatment efficiency point of view. Unfortunately, Patent Literature 1 does not disclose any configuration for increasing the efficiency in utilizing concentrated sulfuric acid.

An object of an aspect of the present invention is to increase the efficiency in utilizing concentrated sulfuric acid in the entire dehydration process.

Solution to Problem

In order to solve the above problem, a dehydration method in accordance with an aspect of the present invention is a hydrogen chloride gas dehydration method of dehydrating hydrogen chloride gas through a multi-step process, the method including: a first dehydration step of bringing hydrogen chloride gas and concentrated sulfuric acid into contact with each other; and a second dehydration step of bringing hydrogen chloride gas that has been obtained through the first dehydration step into contact with concentrated sulfuric acid, wherein a concentration of the concentrated sulfuric acid used in the second dehydration step is higher than a concentration of the concentrated sulfuric acid used in the first dehydration step.

Advantageous Effects of Invention

According to an aspect of the present invention, it is possible to increase the efficiency in utilizing concentrated sulfuric acid in the entire dehydration process.

DESCRIPTION OF EMBODIMENTS

Embodiment 1

(Hydrogen Chloride Gas Dehydration Apparatus)

The following description will discuss an embodiment of the present invention in detail. First, an exemplary dehydration apparatus 100 used in a hydrogen chloride gas dehydration method in accordance with an embodiment of the present invention will be described with reference to FIG. 1.

Figure 1:
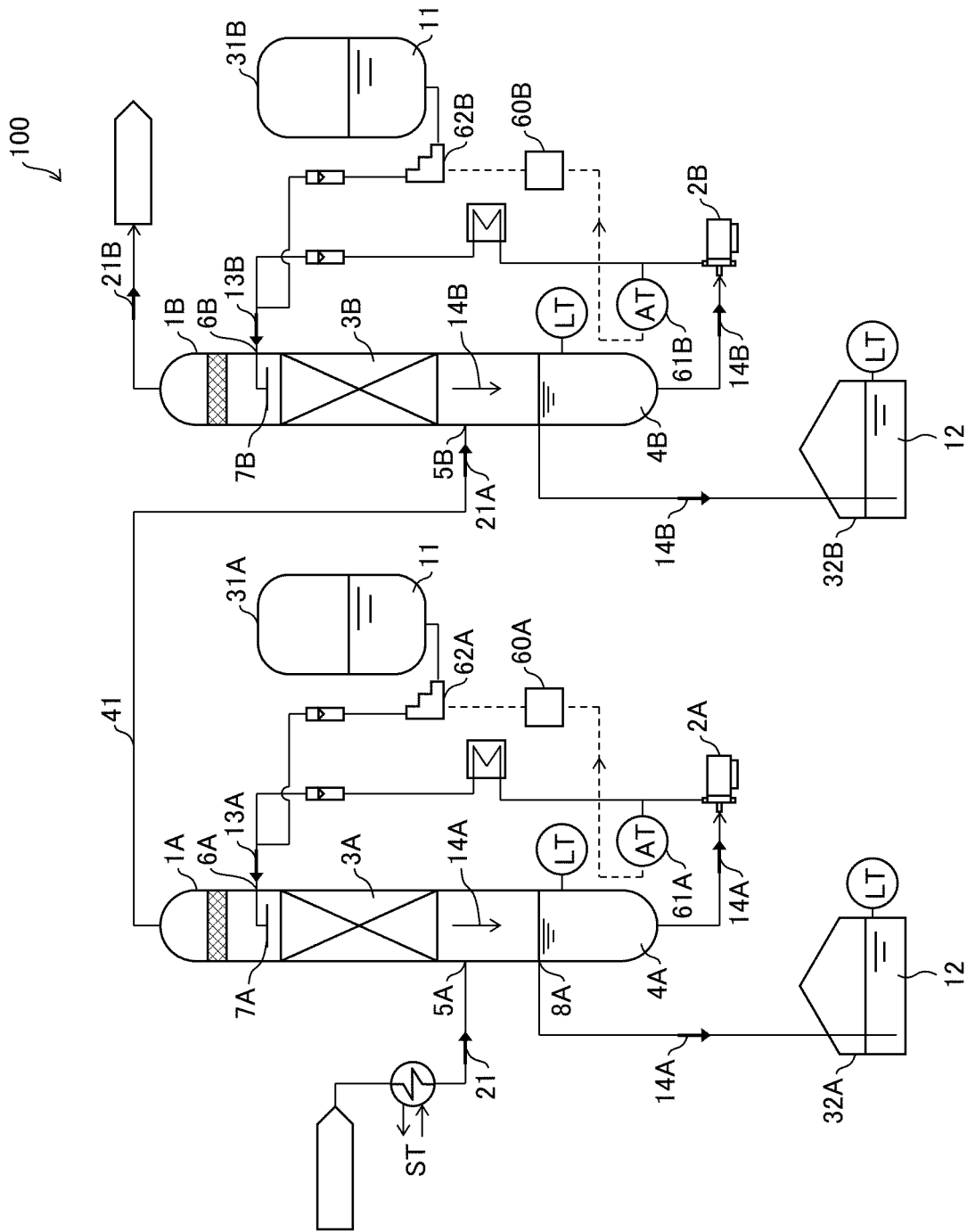
FIG. 1 is a schematic diagram of a dehydration apparatus in accordance with Embodiment 1.

FIG. 1 is a schematic diagram illustrating the structure of the dehydration apparatus 100. The dehydration apparatus 100 is an apparatus that removes water in hydrogen chloride gas through a multi-process step, that is, an apparatus that dehydrates hydrogen chloride gas. More specifically, the dehydration apparatus 100 is an apparatus that dehydrates hydrogen chloride gas by bringing hydrogen chloride gas into contact with concentrated sulfuric acid in a plurality of drying columns to take advantage of the dehydrating action of the concentrated sulfuric acid.

The dehydration apparatus 100 includes a first drying column 1A and a second drying column 1B. The first drying column 1A is a column for performing a first dehydration step of bringing pre-dehydration hydrogen chloride gas 21 and first concentrated sulfuric acid 13A, which is concentrated sulfuric acid for the first dehydration step, into contact with each other. The second drying column 1B is a column for performing a second dehydration step of bringing hydrogen chloride gas 21A, which is obtained through the first dehydration step, into contact with second concentrated sulfuric acid 13B, which is concentrated sulfuric acid for the second dehydration step. The hydrogen chloride gas 21A that has been obtained through the first dehydration step is supplied from the first drying column 1A to the second drying column 1B through a pipe 41. In contrast to the embodiment discussed later, in the dehydration apparatus 100, the concentrated sulfuric acid that has been used in the second drying column 1B is not reused in the first drying column 1A.

The first drying column 1A includes a concentrated sulfuric acid supply tank 31A for supplying concentrated sulfuric acid 11, a pump 2A, and a concentrated sulfuric acid collection tank 32A for collecting concentrated sulfuric acid 14A that has been used in the first dehydration step. Collected concentrated sulfuric acid is stored as collected concentrated sulfuric acid 12 in the concentrated sulfuric acid collection tank 32A. To reuse the concentrated sulfuric acid in the first drying column 1A, the pump 2A delivers at least part of the concentrated sulfuric acid in the first drying column 1A from a discharge port (not illustrated) at a bottom part of the first drying column 1A to a concentrated sulfuric acid supply port 6A formed at an upper part of the first drying column 1A.

Similarly, the second drying column 1B includes a concentrated sulfuric acid supply tank 31B, a pump 2B, and a concentrated sulfuric acid collection tank 32B for collecting concentrated sulfuric acid 14B that has been used in the second dehydration step. Collected concentrated sulfuric acid is stored as the collected concentrated sulfuric acid 12 in the concentrated sulfuric acid collection tank 32B. The pump 2B delivers the concentrated sulfuric acid to the inside of the second drying column 1B via a concentrated sulfuric acid supply port 6B of the second drying column 1B.

Provided in the middle of the first drying column 1A is a packed bed 3A that is packed with a packing material made of a resin. Provision of the packed bed 3A increases an area of contact between the pre-dehydration hydrogen chloride gas 21 and the first concentrated sulfuric acid 13A, and thus leads to efficient dehydration of the pre-dehydration hydrogen chloride gas 21.

Further, provided in the bottom part of the first drying column 1A is a storage section 4A for storing the concentrated sulfuric acid 14A that has been used in the first dehydration step. Provided at a position of a predetermined height (vertically above the storage section 4A) above the bottom of the first drying column 1A is an overflow pipe 8A for overflowing and discharging the concentrated sulfuric acid 14A stored in the storage section 4A. The overflow pipe 8A is connected to the concentrated sulfuric acid collection tank 32A such that a liquid can pass between the overflow pipe 8A and the concentrated sulfuric acid collection tank 32A.

A hydrogen chloride gas supply port 5A is provided so as to be continuous with a space under the packed bed 3A, in order to supply the pre-dehydration hydrogen chloride gas 21. The concentrated sulfuric acid supply port 6A is provided so as to be continuous with a space above the packed bed 3A, in order to supply the first concentrated sulfuric acid 13A. The concentrated sulfuric acid supply port 6A is connected to a spraying section 7A such that a liquid can pass between the concentrated sulfuric acid supply port 6A and the spraying section 7A.

The spraying section 7A is a member for spraying a concentrated sulfuric acid liquid onto the packing material in the packed bed 3A.

The first drying column 1A further includes a control device 60A and a monitoring device 61A for monitoring the concentration of the concentrated sulfuric acid 14A that has been used in the first dehydration step. Upon receiving information on the concentration of the concentrated sulfuric acid 14A from the monitoring device 61A, the control device 60A controls a supply amount of the concentrated sulfuric acid 11 to be supplied from the concentrated sulfuric acid supply tank 31A in accordance with the concentration of the concentrated sulfuric acid 14A.

Similarly, the second drying column 1B is provided with a packed bed 3B, a storage section 4B, a hydrogen chloride gas supply port 5B, a concentrated sulfuric acid supply port 6B, a spraying section 7B, and an overflow pipe 8B. A monitoring device 61B and a control device 60B also serve in the same manner.

In controlling the supply amount of the concentrated sulfuric acid 11, the control device 60A and the control device 60B each control the supply amount of the concentrated sulfuric acid 11 such that the concentration of the second concentrated sulfuric acid 13B used in the second dehydration step is higher than the concentration of the first concentrated sulfuric acid 13A used in the first dehydration step. The control of the supply amount is realized, for example, by the control device 60A controlling a control valve 62A and by the control device 60B controlling a control valve 62B. The control device 60A and the control device 60B are communicably connected to each other, so that such control of the supply amount of the concentrated sulfuric acid 11 can be performed.

In FIG. 1, ST means steam. LT and AT mean a level transmitter and an analyzer transmitter, respectively.

(Flow of Hydrogen Chloride Gas)

The pre-dehydration hydrogen chloride gas 21 is supplied to the inside of the first drying column 1A through the hydrogen chloride gas supply port 5A. Then, in the packed bed 3A, the pre-dehydration hydrogen chloride gas 21 comes into contact with the first concentrated sulfuric acid 13A and is dehydrated (first dehydration step). The hydrogen chloride gas 21A that has been obtained through the first dehydration step is discharged from the top of the first drying column 1A, and is supplied to the inside of the second drying column 1B through the hydrogen chloride gas supply port 5B of the second drying column 1B. Then, in the packed bed 3B, the hydrogen chloride gas 21A comes into contact with the second concentrated sulfuric acid 13B and is dehydrated (second dehydration step). Hydrogen chloride gas 21B that has been obtained through the second dehydration step is discharged from the top of the second drying column 1B.

(Flow of Concentrated Sulfuric Acid)

The concentrated sulfuric acid 11 stored in the concentrated sulfuric acid supply tank 31A is usually concentrated sulfuric acid with a concentration of approximately 98 wt %. The concentrated sulfuric acid supply tank 31A is connected to the first drying column 1A via the control valve 62A. The concentrated sulfuric acid 11 is supplied, as part of the first concentrated sulfuric acid 13A, from the concentrated sulfuric acid supply tank 31A to the first drying column 1A via the concentrated sulfuric acid supply port 6A of the first drying column 1A. The supply amount of the concentrated sulfuric acid 11 to be supplied from the concentrated sulfuric acid supply tank 31A is controlled by the control device 60A as described above.

The first concentrated sulfuric acid 13A is sprayed toward the packed bed 3A via the spraying section 7A. The concentrated sulfuric acid 14A that has been brought into contact with the pre-dehydration hydrogen chloride gas 21 in the packed bed 3A (the concentrated sulfuric acid 14A that has been used in the first dehydration step) is stored in the storage section 4A for storing the concentrated sulfuric acid 14A.

At least part of the concentrated sulfuric acid 14A stored in the storage section 4A is delivered by the pump 2A from the bottom part of the first drying column 1A to the concentrated sulfuric acid supply port 6A of the first drying column 1A. The concentrated sulfuric acid 14A is supplied, as at least part of the first concentrated sulfuric acid 13A (in some cases, together with the concentrated sulfuric acid 11), to the first drying column 1A.

The flow of the concentrated sulfuric acid is the same for the second drying column 1B. The second concentrated sulfuric acid 13B supplied through the concentrated sulfuric acid supply port 6B is sprayed toward the packed bed 3B via the spraying section 7B. In the packed bed 3B, the concentrated sulfuric acid 14B that has been brought into contact with the hydrogen chloride gas 21A obtained through the first dehydration step (the concentrated sulfuric acid 14B that has been used in the second dehydration step) is stored in the storage section 4B.

At least part of the concentrated sulfuric acid 14B stored in the storage section 4B is delivered by the pump 2B from the bottom part of the second drying column 1B to the concentrated sulfuric acid supply port 6B. The concentrated sulfuric acid 14B is supplied, as at least part of the second concentrated sulfuric acid 13B (in some cases, together with the concentrated sulfuric acid 11), to the second drying column 1B. The supply amount of the concentrated sulfuric acid 11 to be supplied from the concentrated sulfuric acid supply tank 31B is controlled by the control device 60B as described above.

In Embodiment 1, the second concentrated sulfuric acid 13B (concentrated sulfuric acid used in the second dehydration step) has a higher concentration than the first concentrated sulfuric acid 13A (concentrated sulfuric acid used in the first dehydration step). As the second concentrated sulfuric acid 13B, for example, concentrated sulfuric acid with a concentration of not lower than 96 wt % is used. As the first concentrated sulfuric acid 13A, concentrated sulfuric acid with a concentration of not lower than 80 wt % and lower than 95 wt %, preferably not lower than 85 wt % and lower than 90 wt %, is used.

Since the concentration of the first concentrated sulfuric acid 13A is sufficiently lower than 98 wt %, the concentrated sulfuric acid 11 in the concentrated sulfuric acid supply tank 31A does not have to be concentrated sulfuric acid with a concentration of 98 wt %.

Further, as described above, there is a difference in concentration between the concentrated sulfuric acid used in the first dehydration step and the concentrated sulfuric acid used in the second dehydration step. Thus, as the first concentrated sulfuric acid 13A, the concentrated sulfuric acid 14B collected after having been used in the second dehydration step can also be used.

Although the above description has discussed the case where there are two drying columns with reference to FIG. 1, the number of drying columns is not limited to two and may be three or more.

Further, the above description has discussed the embodiment in which the first dehydration step is performed in the first drying column 1A, and the second dehydration step is performed in the second drying column 1B. However, there may be an embodiment in which a plurality of dehydration steps including the first dehydration step and the second dehydration step are performed in one drying column.

Effect of Embodiment 1

As described above, the dehydration method of Embodiment 1 is a hydrogen chloride gas dehydration method of dehydrating hydrogen chloride gas through a multi-step process, and is performed using the dehydration apparatus 100. Further, the dehydration method of Embodiment 1 includes: a first dehydration step of bringing hydrogen chloride gas (pre-dehydration hydrogen chloride gas 21) and concentrated sulfuric acid (first concentrated sulfuric acid 13A) into contact with each other; and a second dehydration step of bringing hydrogen chloride gas (hydrogen chloride gas 21A) that has been obtained through the first dehydration step into contact with concentrated sulfuric acid (second concentrated sulfuric acid 13B). The concentration of the concentrated sulfuric acid (second concentrated sulfuric acid 13B) used in the second dehydration step is higher than the concentration of the concentrated sulfuric acid (first concentrated sulfuric acid 13A) used in the first dehydration step.

According to this dehydration method, after dehydration of hydrogen chloride gas has been carried out in the first dehydration step, dehydration in the second dehydration step is carried out with use of concentrated sulfuric acid that has a concentration higher than that of concentrated sulfuric acid used in the first dehydration step. Even though a low concentration of concentrated sulfuric acid is used in the first dehydration step, a relatively high dehydration effect is obtained. Therefore, by efficiently utilizing a low concentration of concentrated sulfuric acid in the upstream first dehydration step, it is possible to increase the efficiency in utilizing concentrated sulfuric acid in the entire dehydration process of a plurality of steps.

Embodiment 2

(Hydrogen Chloride Gas Dehydration Apparatus)

The following description will discuss another embodiment of the present invention. Note that, for convenience, members having functions identical to those of the respective members of the foregoing embodiment are given respective identical reference numerals, and a description of those members is not repeated.

Figure 2:
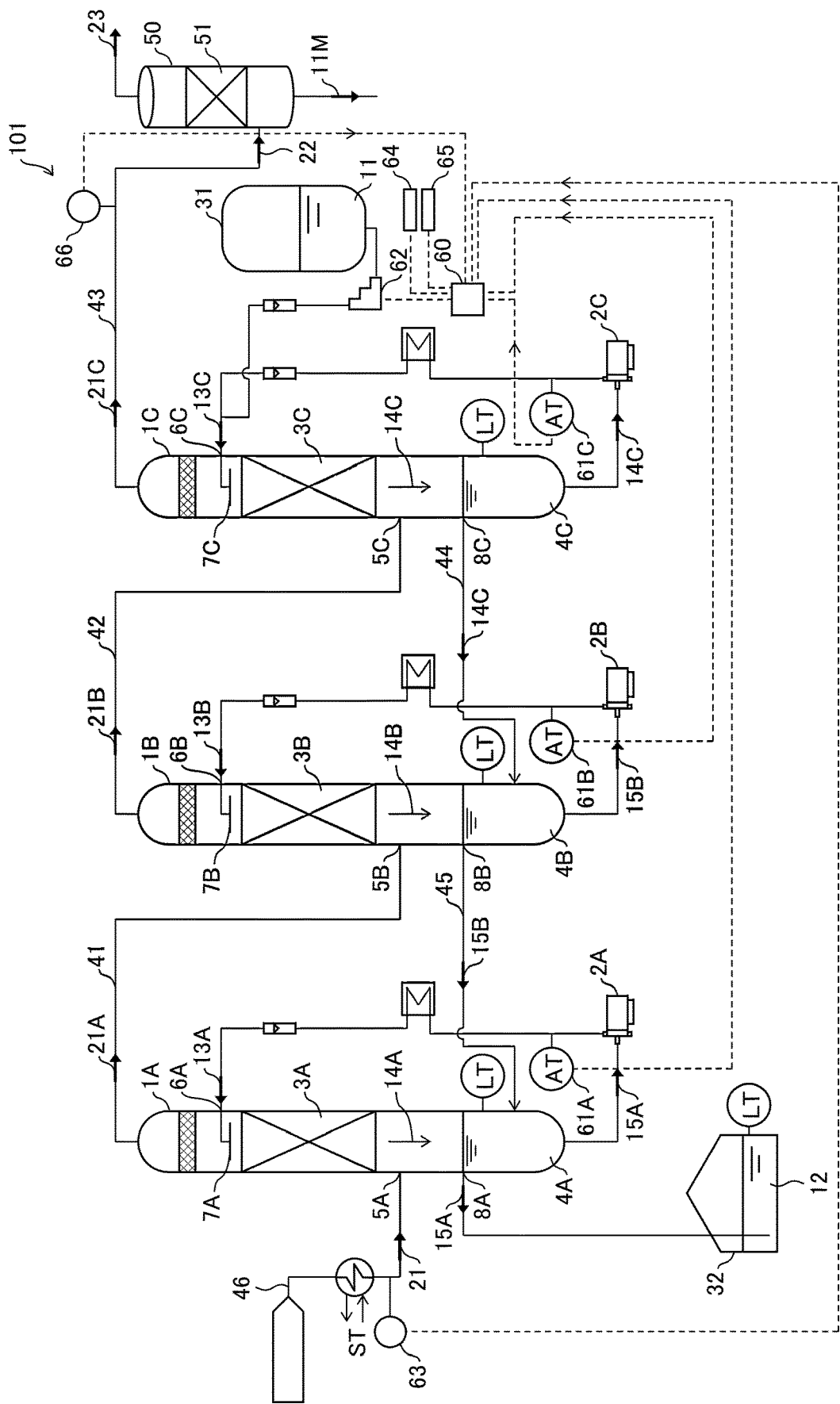
FIG. 2 is a schematic diagram of a dehydration apparatus in accordance with Embodiment 2.

FIG. 2 is a schematic diagram illustrating the structure of a dehydration apparatus 101. The dehydration apparatus 101 is an example of an apparatus used in a hydrogen chloride gas dehydration method in accordance with Embodiment 2 of the present invention. The dehydration apparatus 101 includes a first drying column 1A, a second drying column 1B, a third drying column 1C, and a mist separator 50. The third drying column 1C is a column for performing a third dehydration step of bringing hydrogen chloride gas 21B, which is obtained through the second dehydration step, and third concentrated sulfuric acid 13C, which is concentrated sulfuric acid for the third dehydration step, into contact with each other. The third drying column 1C includes a pump 2C for delivering the concentrated sulfuric acid to the inside of the third drying column 1C via a concentrated sulfuric acid supply port 6C of the third drying column 1C. The concentrated sulfuric acid supply tank 31 is connected via a control valve 62 to the third drying column 1C such that a liquid can pass between the concentrated sulfuric acid supply tank 31 and the third drying column 1C. The concentrated sulfuric acid collection tank 32 is connected to the overflow pipe 8A of the first drying column 1A such that a liquid can pass between the concentrated sulfuric acid collection tank 32 and the overflow pipe 8A.

The mist separator 50 is provided with a glass filter 51 for capturing sulfuric acid mist, and is a device for removing sulfuric acid mist from hydrogen chloride gas 22 that has been obtained through a multi-step process.

In the first drying column 1A, a packed bed 3A, a storage section 4A, a hydrogen chloride gas supply port 5A, a concentrated sulfuric acid supply port 6A, a spraying section 7A, and an overflow pipe 8A are the same as those in Embodiment 1.

Similarly, the second drying column 1B is provided with a packed bed 3B, a storage section 4B, a hydrogen chloride gas supply port 5B, a concentrated sulfuric acid supply port 6B, a spraying section 7B, and an overflow pipe 8B. Similarly, the third drying column 1C is provided with a packed bed 3C, a storage section 4C, a hydrogen chloride gas supply port 5C, a concentrated sulfuric acid supply port 6C, a spraying section 7C, and an overflow pipe 8C.

(Flow of Hydrogen Chloride Gas)

Pre-dehydration hydrogen chloride gas 21 is supplied to the inside of the first drying column 1A through the hydrogen chloride gas supply port 5A. Then, in the packed bed 3A, the pre-dehydration hydrogen chloride gas 21 comes into contact with the first concentrated sulfuric acid 13A and is dehydrated (first dehydration step). Hydrogen chloride gas 21A that has been obtained through the first dehydration step is discharged from the top of the first drying column 1A, passes through a pipe 41, and is supplied to the inside of the second drying column 1B through the hydrogen chloride gas supply port 5B of the second drying column 1B. Then, in the packed bed 3B, the hydrogen chloride gas 21A comes into contact with the second concentrated sulfuric acid 13B and is dehydrated (second dehydration step). Hydrogen chloride gas 21B that has been obtained through the second dehydration step, is discharged from the top of the second drying column 1B, passes through a pipe 42, and is supplied to the inside of the third drying column 1C through the hydrogen chloride gas supply port 5C of the third drying column 1C. Then, in the packed layer 3C, the hydrogen chloride gas 21B comes into contact with the third concentrated sulfuric acid 13C, which is the concentrated sulfuric acid for the third dehydration step, and is dehydrated (third dehydration step). Hydrogen chloride gas 21C that has been obtained through the third dehydration step is discharged from the top of the third drying column 1C, passes through a pipe 43, and is supplied to the mist separator 50.

By passage of the hydrogen chloride gas 22 supplied to the mist separator 50 after all of the dehydration steps through the glass filter 51 in the mist separator 50, the sulfuric acid mist contained in the hydrogen chloride gas 22 is captured. The hydrogen chloride gas having passed through the glass filter 51 is discharged, as treated hydrogen chloride gas 23, from the mist separator 50, and is supplied to a storage tank or the like (not illustrated).

Concentrated sulfuric acid 11M collected by the mist separator 50 can be reused as, for example, concentrated sulfuric acid which is to be used for dehydration in the drying column.

(Flow of Concentrated Sulfuric Acid)

The concentrated sulfuric acid 11 stored in the concentrated sulfuric acid supply tank 31 is usually concentrated sulfuric acid with a concentration of approximately 98 wt %. The concentrated sulfuric acid 11 is supplied, as at least part of the third concentrated sulfuric acid 13C, from the concentrated sulfuric acid supply tank 31 to the third drying column 1C via the concentrated sulfuric acid supply port 6C of the third drying column 1C. The third concentrated sulfuric acid 13C is sprayed toward the packed bed 3C via the spraying section 7C. Concentrated sulfuric acid 14C that has been brought into contact with the hydrogen chloride gas 21C in the packed bed 3C (that has been used in the third dehydration step) is stored in the storage section 4C. The supply amount of the concentrated sulfuric acid 11 to be supplied from the concentrated sulfuric acid supply tank 31A is controlled by the control device 60. Details of a concentration control method performed by the control device 60 will be described later.

At least part of the concentrated sulfuric acid 14C that has been used in the third dehydration step and stored in the storage section 4C is delivered by the pump 2C from the bottom part of the third drying column 1C to the concentrated sulfuric acid supply port 6C of the third drying column 1C. The concentrated sulfuric acid 14C is supplied as at least part of the third concentrated sulfuric acid 13C (in some cases, together with the concentrated sulfuric acid 11) to the third drying column 1C.

In a case where the amount of the concentrated sulfuric acid 14C stored in the storage section 4C exceeds a predetermined amount, an excess amount of the concentrated sulfuric acid 14C exceeding the predetermined amount is discharged from the third drying column 1C via the overflow pipe 8C, passes through a pipe 44, and is supplied to the inside of the storage section 4B of the second drying column 1B. That is, at least part of the concentrated sulfuric acid 14C that has been used in the third dehydration step is reused as the second concentrated sulfuric acid 13B in the second dehydration step.

At least part of concentrated sulfuric acid 15B stored in the storage section 4B of the second drying column is delivered by the pump 2B from the bottom part of the second drying column 1B to the concentrated sulfuric acid supply port 6B of the second drying column 1B. The concentrated sulfuric acid 15B is supplied, as the second concentrated sulfuric acid 13B, to the second drying column 1B. The second concentrated sulfuric acid 13B is sprayed toward the packed bed 3B via the spraying section 7B. Concentrated sulfuric acid 14B that has been brought into contact with the hydrogen chloride gas 21A in the packed bed 3B (that has been used in the second dehydration step) is stored in the storage section 4B.

In a case where the amount of the concentrated sulfuric acid 15B stored in the storage section 4B exceeds a predetermined amount, an excess amount of the concentrated sulfuric acid 15B exceeding the predetermined amount is discharged from the second drying column 1B via the overflow pipe 8B, passes through a pipe 45, and is supplied to the inside of the storage section 4A of the first drying column 1A. That is, at least part of the concentrated sulfuric acid 14B that has been used in the second dehydration step is reused as the first concentrated sulfuric acid 13A in the first dehydration step.

At least part of concentrated sulfuric acid 15A stored in the storage section 4A of the first drying column 1A is delivered by the pump 2A from the bottom part of the first drying column 1A to the concentrated sulfuric acid supply port 6A of the first drying column 1A. The concentrated sulfuric acid 15A is supplied, as the first concentrated sulfuric acid 13A, to the first drying column 1A. The first concentrated sulfuric acid 13A is sprayed toward the packed bed 3A via the spraying section 7A. Concentrated sulfuric acid 14A that has been brought into contact with the pre-dehydration hydrogen chloride gas 21 in the packed bed 3A (that has been used in the first dehydration step) is stored in the storage section 4A.

In a case where the amount of the concentrated sulfuric acid (concentrated sulfuric acid 15A) stored in the storage section 4A exceeds a predetermined amount, an excess amount of the concentrated sulfuric acid 15A exceeding the predetermined amount is discharged from the first drying column 1A via the overflow pipe 8A and is collected in the concentrated sulfuric acid collection tank 32. The collected concentrated sulfuric acid is stored, as the collected concentrated sulfuric acid 12, in the concentrated sulfuric acid collection tank 32.

As described above, by reusing, in the upstream dehydration step, the concentrated sulfuric acid that has been used in the downstream dehydration step, it is possible to increase the efficiency in utilizing the concentrated sulfuric acid in the entire multi-step dehydration process and further reduce the amount of concentrated sulfuric acid discarded.

In Embodiment 2, the concentration of the concentrated sulfuric acid used in a most downstream dehydration step (third dehydration step) is the highest concentration, as compared with the concentrations of the concentrated sulfuric acids used in the other dehydration steps. With this configuration, it is possible to increase the certainty of dehydration of the hydrogen chloride gas in the most downstream dehydration step.

In the method in accordance with Embodiment 2 in which hydrogen chloride gas is dehydrated through a multi-step process, the multi-step process consists of the first dehydration step, the second dehydration step carried out after the first dehydration step, and the third dehydration step carried out after the second dehydration step. The concentration of the concentrated sulfuric acid (concentration of the concentrated sulfuric acid 14C) reused in the second dehydration step after having been used in the third dehydration step is not lower than 96 wt %. Further, the concentration of the concentrated sulfuric acid (concentration of the concentrated sulfuric acid 15B) reused in the first dehydration step after having been used in the second dehydration step is not lower than 85 wt % and lower than 96 wt %. Further, the concentration of the concentrated sulfuric acid (concentration of the concentrated sulfuric acid 15A) after having been used in the first dehydration step is not lower than 75 wt % and lower than 85 wt %.

In Embodiment 2, the case where there are three drying columns has been discussed. However, the number of drying columns is not limited to three and only needs to be two or more. In a case where there are two drying columns, the multi-step process consists of the first dehydration step and the second dehydration step. The concentration of the concentrated sulfuric acid (concentration of the concentrated sulfuric acid 15B) reused in the first dehydration step after having been used in the second dehydration step is not lower than 96 wt %. Further, the concentration of the concentrated sulfuric acid (concentration of the concentrated sulfuric acid 15A) after having been used in the first dehydration step is not lower than 85 wt % and lower than 90 wt %.

Effect of Embodiment 2

Figure 3:
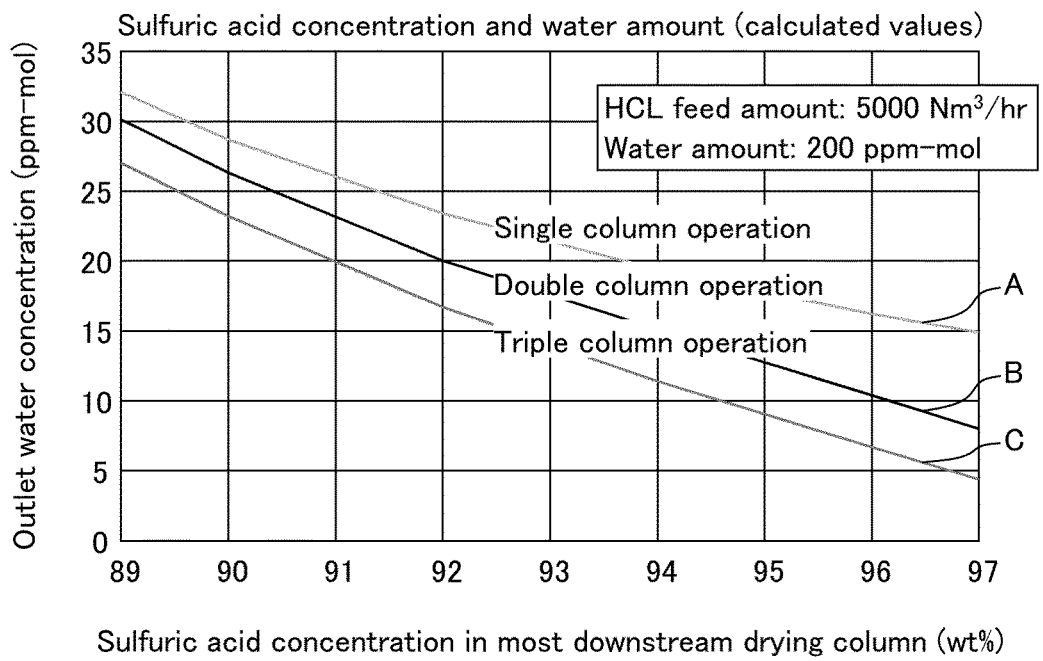
FIG. 3 is a graph showing a relationship between a sulfuric acid concentration in a most downstream drying column and an outlet water concentration of hydrogen chloride gas in the most downstream drying column.

FIG. 3 is a graph showing a relationship between a sulfuric acid concentration in the most downstream drying column and an outlet water concentration of hydrogen chloride gas in the most downstream drying column when hydrogen chloride gas having a water concentration of 200 ppm-mol is supplied at 5000 Nm³/hr. Here, the sulfuric acid concentration in the most downstream drying column is a concentrated sulfuric acid concentration (wt %) in the storage section of the most downstream drying column. The outlet water concentration of the hydrogen chloride gas is a water concentration (ppm-mol) of the hydrogen chloride gas 22 that has obtained through the multi-step process.

In FIG. 3, a line A shows a case where there is one drying column (the first dehydration step alone). A line B shows a case where a double column operation (the multi-step process consists of the first dehydration step and the second dehydration step) is carried out by the method in Embodiment 2. A line C shows a case where a triple column operation (the multi-step process consists of the first dehydration step, the second dehydration step, and the third dehydration step) is carried out by the method in Embodiment 2.

The results indicated by the lines A to C in FIG. 3 are respective calculated values. Details of a method for calculating the calculated values will be described later.

In FIG. 3, for example, in a case where the outlet water concentration is 15 ppm-mol, the sulfuric acid concentration in the drying column is approximately 97 wt % in a single column operation. In contrast, it can be seen that in the case of the double column operation, the sulfuric acid concentration in the drying column is approximately 94 wt %, and in the case of the triple column operation, the sulfuric acid concentration in the drying column is approximately 92.5 wt %. This means that the concentrated sulfuric acid is more efficiently utilized by the dehydration with use of a plurality of drying columns (dehydration carried out by the method in Embodiment 2).

Thus, in a case where the water concentration of hydrogen chloride gas is reduced to a specific water concentration, the dehydration with use of a plurality of columns (by the multi-step process) makes it possible to more efficiently utilize concentrated sulfuric acid and reduce the amount of concentrated sulfuric acid used. This effect is more remarkable in the case of the triple column operation than in the case of the double column operation.

(Relational Expression of Water Removal Rate of Hydrogen Chloride Gas, Concentrated Sulfuric Acid Concentration, and Gas Supply Amount)

Figure 4:
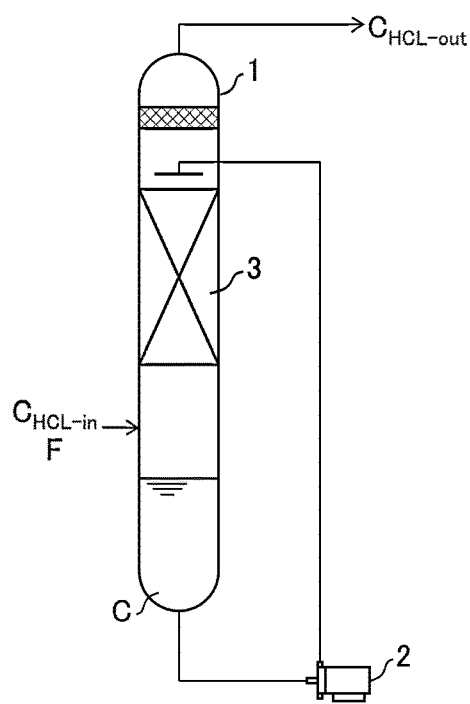
FIG. 4 is a schematic diagram of a device used for derivation of a relational expression of a water removal rate of hydrogen chloride gas, a concentrated sulfuric acid concentration, and a gas supply amount.

Here, derivation of a relational expression of a water removal rate of hydrogen chloride gas, a concentrated sulfuric acid concentration, and a gas supply amount will be described with reference to FIG. 4. FIG. 4 is a schematic diagram of a device used for derivation of the relational expression. Generally, in a case where the flow rate of concentrated sulfuric acid circulated through the drying column was constant, it was empirically clear that the water removal rate of hydrogen chloride gas is expressed as a function of the concentrated sulfuric acid concentration in the drying column and the supply amount of hydrogen chloride gas.

Thus, the inventors measured, with use of a drying column 1 illustrated in FIG. 4, a water removal rate K in a case where hydrogen chloride gas in a predetermined supply amount F was supplied to the drying column 1 through which concentrated sulfuric acid having a predetermined sulfuric acid concentration C was circulated. Here, the sulfuric acid concentration C is a concentration (wt %) of the concentrated sulfuric acid circulating through the drying column 1. The hydrogen chloride gas supply amount F is a supply amount (Nm³/hr) of the hydrogen chloride gas supplied to the drying column 1. The water removal rate K is represented by the following expression (1):

$$K=(\alpha-\beta)/\alpha \quad (1)$$

In the expression (1), $\alpha$ and $\beta$ mean the following numerical values:

$\alpha$=(water concentration ($C_{HCl\text{-}in}$) of hydrogen chloride gas supplied to the drying column 1)

$\beta$=(water concentration ($C_{HCl\text{-}out}$) of hydrogen chloride gas discharged from the drying column 1)

Table 1 shows an example of the values of the water removal rate K when the hydrogen chloride gas supply amount F and the sulfuric acid concentration C were set to respectively predetermined values. Note that the amount of circulating sulfuric acid per unit cross-sectional area of the drying column 1 was 5 m³/m²/hr.

TABLE 1

| F (Nm³/hr) | C (wt %) | | |
|---|---|---|---|
| | 80 | 94.5 | 97.8 |
| 1300 | 0.835 | 0.918 | 0.926 |
| 2600 | 0.764 | 0.889 | 0.912 |
| 3200 | 0.739 | 0.877 | 0.908 |
| 3900 | 0.715 | 0.864 | 0.903 |

From the results in Table 1 above, it was found that the relationship of the water removal rate K, the concentrated sulfuric acid concentration C, and the hydrogen chloride gas supply amount F is expressed by the following expression (2):

$$K = 0.024 \times \ln(C) \times \ln(F) \quad (2)$$

(Method for Calculating Hydrogen Chloride Gas Water Concentration and Concentrated Sulfuric Acid Concentration in Each Column)

The hydrogen chloride gas water concentration and the concentrated sulfuric acid concentration in each column of Embodiment 2 can be calculated by using the expression (2) which has been derived as described above. The above relationship of the water removal rate K, the concentrated sulfuric acid concentration C, and the hydrogen chloride gas supply amount F can be similarly applied to each column.

In this case, the sulfuric acid concentration C is a concentration (wt %) of concentrated sulfuric acid in the storage section (4A, 4B, 4C) of each column. The hydrogen chloride gas supply amount F is a supply amount (Nm³/hr) of hydrogen chloride gas to be supplied to each column. The water removal rate K in each drying column can be calculated by using the above expression (1).

The above expressions (1) and (2) are stored in a storage device 64 that is communicably connected to the control device 60, and the control device 60 performs concentration control of the concentrated sulfuric acid in the dehydration apparatus 101 with use of a measured value (or a target value). A method for controlling the supply amount of concentrated sulfuric acid by the control device 60 will be described below.

(Control of Supply Amount of Concentrated Sulfuric Acid by Control Device)

A method of controlling the supply amount of concentrated sulfuric acid by the control device 60 in the dehydration apparatus 101 includes a target value determination step and an operation control step.

Target Value Determination Step

The purpose of the control performed by the control device 60 is to achieve a target water concentration of hydrogen chloride gas by maintaining the sulfuric acid concentrations in the first to third drying columns within predetermined ranges through adjustment of the supply amount of concentrated sulfuric acid supplied from the concentrated sulfuric acid supply tank 31. For that purpose, in the target value determination step, a target value $C_A$ of a concentration ($C_3$) of the concentrated sulfuric acid 14C that has been used in the third dehydration step, which target value $C_A$ is needed for adjustment of the supply amount of concentrated sulfuric acid, is determined.

In determining the target value $C_A$ through steps (A2) to (A9) below, an initial value is used at the start of operation. After the start of operation, a measured value is used. In a case where the measured value is changed due to the operation control step described later, the target value $C_A$ is updated by repeating the steps (A1) to (A8) below.

(A1) The control device 60 receives, from a hydrogen chloride gas monitoring device 63 provided in a hydrogen chloride gas supply path 46, information indicative of a water concentration ($C_{HCl-in(1)}$) of the pre-dehydration hydrogen chloride gas 21 to be supplied to the first drying column 1A and information indicative of the supply amount ($F_{HCl}$) of hydrogen chloride gas to be supplied to the first drying column 1A.

(A2) At the start of operation, the control device 60 receives, from an input device 65, information indicative of a target concentration ($C^1$) of waste concentrated sulfuric acid that has been inputted as an initial value to the input device 65 by a user. After the start of operation, the control device 60 receives, from the monitoring device 61A, information indicative of the concentration ($C_1$) of the concentrated sulfuric acid 15A stored in the storage section 4A of the first drying column 1A.

(A3) The control device 60 calculates a water concentration ($C_{HCl-out(1)}$) of the hydrogen chloride gas 21A to be discharged from the first drying column 1A, by using (i) $F_{HCl}$, (ii) $C_{HCl-in(1)}$ having been received in the step A1, (iii) $C^1$ (or $C_1$) having been received in the step A2, and (iv) the expressions (1) and (2). Here, $C_{HCl-out(1)}$ is equal to a water concentration ($C_{HCl-in(2)}$) of the hydrogen chloride gas 21A to be supplied to the second drying column 1B.

Specifically, the control device 60 performs the following operation:

$$C_{HCl-out(1)} = C_{HCl-in(1)}\{1 - 0.024 \times \ln(F_{HCl})\}$$

(A4) The control device 60 receives, from the input device 65, information indicative of the concentration ($C_{feed}$) of the concentrated sulfuric acid 11 that has been inputted to the input device 65, as an initial value of information indicative of the concentration ($C_3$) of the concentrated sulfuric acid 14C stored in the storage section 4C of the third drying column 1C. The concentration ($C_{feed}$) is usually 98 wt %.

(A5) The control device 60 receives, from the input device 65, as an initial value, information indicative of a target water concentration ($C_{HCl-out(3)}$) that has been inputted to the input device 65. After the start of operation, the control device 60 receives, from a hydrogen chloride gas monitoring device 66, information indicative of the water concentration ($C_{HCl-out(3)}$) of the hydrogen chloride gas 21C obtained through the third dehydration step.

(A6) The control device 60 calculates a water concentration ($C_{HCl-in(3)}$) of the hydrogen chloride gas 21B to be supplied to the third drying column 1C, by using (i) $F_{HCl}$, (ii) $C_{feed}$ that has been received in the step A4 and $C_{HCl-out(3)}$ (or $C_{HCl-out(3)}$) that has been received in the A5 step, and (iii) the expressions (1) and (2). Here, $C_{HCl-in\ (3)}$ is equal to a water concentration ($C_{HCl-out(2)}$) of the hydrogen chloride gas 21A to be discharged from the second drying column 1B.

Specifically, the control device 60 performs the following operation:

$$C_{HCl-in(3)} = C_{HCl-out(3)} / \{1 - 0.024 \times \ln(C_{feed}) \times \ln(F_{HCl})\}.$$

(A7) The control device 60 calculates the concentration ($C_2$) of the concentrated sulfuric acid 15B in the second drying column 1B, by using (i) $F_{HCl}$, (ii) $C_{HCl-out(2)}$ that has been calculated in the step A3, (iii) $C_{HCl-out(2)}$ that has been calculated in the step A6, and (iv) the expressions (1) and (2).

Specifically, the control device 60 performs the following operation:

$$\ln(C_2) = (C_{HCl-in(2)} - C_{HCl-out(2)}) / (C_{HCl-in(2)} \times 0.024 \times \ln(F_{HCl})),$$

that is, $C_2 = e^{\{(C_{HCl-in(2)} - C_{HCl-out(2)})/(C_{HCl-in(2)} \times 0.024 \times \ln(F_{HCl}))\}}$.

(A8) The control device 60 calculates the target value $C_A$ of the concentration of the concentrated sulfuric acid 14C in the third drying column 1C, by using (i) $F_{HCl}$, (ii) $C_{HCl\text{-}out(3)}$ received in the step A5, (iii) $C_{HCl\text{-}in(3)}$ calculated in the step A5, and (iii) the expressions (1) and (2).

Specifically, the control device 60 performs the following operation:

$$C_A = e^{\{(C_{HCl\text{-}in(3)} - C_{HCl\text{-}out(3)})/(C_{HCl\text{-}in(3)} \times 0.024 \times \ln(F_{HCl}))\}}$$

(A9) The control device 60 sets, as the target value $C_A$, $C_A$ that has been calculated in the step A8.

<Operation Control Step>

Following the target value determination step, the operation control step is performed. In the operation control step, steps B1 to B4 below are performed by the control device 60.

(B1) The control device 60 receives, from the monitoring device 61C, information indicative of the concentration ($C_3$) of the concentrated sulfuric acid 14C that has been used in the third dehydration step.

(B2) The control device 60 compares the information indicative of $C_3$ that has been obtained in the step B1 with the target value $C_A$.

(B3) In a case where $C_3$ is lower than the target value $C_A$, the control device 60 increases the opening degree of the control valve 62 to increase the supply amount of the concentrated sulfuric acid 11 to be supplied from the concentrated sulfuric acid supply tank 31 to the third drying column 1C.

(B4) In a case where $C_3$ is higher than the target value $C_A$, the control device 60 decrease the opening degree of the control valve 62 to decrease the supply amount of the concentrated sulfuric acid 11 to be supplied from the concentrated sulfuric acid supply tank 31 to the third drying column 1C.

(B5) In a case where $C_3$ is equal to the target value $C_A$, the control device 60 maintains the opening degree of the control valve 62 and maintains the supply amount of the concentrated sulfuric acid 11 to be supplied from the concentrated sulfuric acid supply tank 31 to the third drying column 1C.

(Operation Example)

The conditions and results of the dehydration treatment performed by the dehydration apparatus 101 of Embodiment 2 under control of the concentration control method as described above are shown in Table 2 below.

Table 2 shows that there is close agreement between estimated values calculated with use of the conditions shown in Table 2 and measured values of the sulfuric acid concentrations actually measured under control of the control device 60. From this, it has been revealed that the above control method suitably controls the sulfuric acid concentration of each column in the dehydration apparatus of Embodiment 2, and achieves the target water concentration at the outlet. More specifically, regarding the control of the sulfuric acid concentrations, the following points were demonstrated: (i) a third drying column sulfuric acid concentration (the concentration of the concentrated sulfuric acid reused in the second dehydration step after having been used in the third dehydration step) is not lower than 96 wt %; (ii) a second drying column sulfuric acid concentration (the concentration of the concentrated sulfuric acid reused in the first dehydration step after having been used in the second dehydration step) falls within a range of not lower than 85 wt % and lower than 96 wt %; and (iii) a first drying column sulfuric acid concentration (the concentration of the concentrated sulfuric acid after having been used in the first dehydration step) falls within a range of not lower than 75 wt % and lower than 85 wt %.

(Application in Trichlorosilane Synthesis)

Hydrogen chloride gas with water content that has been reduced by the dehydration method of Embodiment 1 or 2 can be used for synthesis of trichlorosilane. That is, it is possible to provide a method for producing trichlorosilane by reacting hydrogen chloride gas with water content that has been reduced by the dehydration method of Embodiment 1 or 2 with metallic silicon.

Trichlorosilane synthesis in which hydrogen chloride gas and metallic silicon are contained as raw materials is carried out in a synthesis column. Water contained in the hydrogen chloride gas which is the raw material can cause erosion of a dispersion plate in the synthesis column. Thus, it is preferable that the concentration of water contained in the hydrogen chloride gas for use in the reaction is lower.

By using the hydrogen chloride gas with water content that has been reduced by the dehydration method of Embodiment 1 or 2, it is possible to reduce the erosion in the trichlorosilane synthesis column. This makes it possible to increase a useful life of the dispersion plate.

The present invention is not limited to the embodiments, but can be altered by a skilled person in the art within the scope of the claims. The present invention also encom-

TABLE 2

| Conditions | Hydrogen chloride gas water concentration (inlet) | ppm-mol | 2000 | | | |
| --- | --- | --- | --- | --- | --- | --- |
| | Waste sulfuric acid target concentration ($C_{1'}$) | wt % | 80 | | | |
| | First drying column sulfuric acid concentration | wt % | 80 | | | |
| | Hydrogen chloride gas target water concentration (outlet) | ppm-mol | 5 | | | |
| | Amount of circulating sulfuric acid | m³/m²/hr | 5 | | | |
| | Hydrogen chloride gas supply amount | Nm³/hr | 130 | | 320 | |
| | 98 wt % concentrated sulfuric acid supply amount | kg/hr | 0.9 | | 2.3 | |
| | | | Estimated values | Measured values | Estimated values | Measured values |
| Results | First drying column sulfuric acid concentration | wt % | 80 | 81 | 80 | 82 |
| | Second drying column sulfuric acid concentration | wt % | 94.5 | 93.7 | 93 | 92 |
| | Third drying column sulfuric acid concentration | wt % | 97.8 | 97.8 | 97.4 | 97.8 |
| | First drying column outlet water concentration | ppm-mol | 330 | 280 | 520 | 470 |
| | Second drying column outlet water concentration | ppm-mol | 27 | 30 | 64 | 75 |
| | Third drying column outlet water concentration | ppm-mol | 5 | 4 | 5 | 2 | passes, in its technical scope, any embodiment derived by combining technical means disclosed in differing embodiments.

REFERENCE SIGNS LIST 1A, 1B, 1C: first drying column, second drying column, third drying column
2A, 2B, 2C: pump
3A, 3B, 3C: packed bed
4A, 4B, 4C: storage section
5A, 5B, 5C: hydrogen chloride gas supply port
6A, 6B, 6C: concentrated sulfuric acid supply port
7A, 7B, 7C: spraying section
8A, 8B, 8C: overflow pipe
11, 11M: concentrated sulfuric acid
14A, 14B, 14C: concentrated sulfuric acid that has been used in the first dehydration step, concentrated sulfuric acid that has been used in the second dehydration step, and concentrated sulfuric acid that has been used in the third dehydration step
13A, 13B, 13C: first concentrated sulfuric acid, second concentrated sulfuric acid, and third concentrated sulfuric acid (concentrated sulfuric acid used in the first dehydration step, concentrated sulfuric acid used in the second dehydration step, and concentrated sulfuric acid used in the third dehydration step)
21: pre-dehydration hydrogen chloride gas
21A, 21B, 21C: hydrogen chloride gas that has been obtained through the first dehydration step, hydrogen chloride gas that has been obtained through the second dehydration step, and hydrogen chloride gas that has been obtained through the third dehydration step
31, 31A, 31B: concentrated sulfuric acid supply tank
32, 32A, 32B: concentrated sulfuric acid collection tank
50: mist separator
51: glass filter
60, 60A, 60B: control device
61A, 61B, 61C: monitoring device
62, 62A, 62B: control valve
63: hydrogen chloride gas monitoring device
64: storage device
65: input device
100, 101: dehydration apparatus

The invention claimed is:

1. A method of dehydrating hydrogen chloride gas through a multi-step process, the method comprising:
   a first dehydration step of bringing hydrogen chloride gas and concentrated sulfuric acid into contact with each other; and
   a second dehydration step of bringing hydrogen chloride gas that has been obtained through the first dehydration step into contact with concentrated sulfuric acid,
   wherein a concentration of the concentrated sulfuric acid used in the second dehydration step is higher than a concentration of the concentrated sulfuric acid used in the first dehydration step,
   wherein at least part of the concentrated sulfuric acid that has been used in the second dehydration step is reused in the first dehydration step,
   wherein the multi-step process consists of the first dehydration step, the second dehydration step, and a third dehydration step carried out after the second dehydration step,
   wherein at least part of concentrated sulfuric acid that has been used in the third dehydration step is reused in the second dehydration step,
   a concentration of the concentrated sulfuric acid reused in the second dehydration step after having been used in the third dehydration step is not lower than 96 wt %,
   a concentration of the concentrated sulfuric acid reused in the first dehydration step after having been used in the second dehydration step is not lower than 85 wt % and lower than 96 wt %, and
   a concentration of the concentrated sulfuric acid after having been used in the first dehydration step is not lower than 75 wt % and lower than 85 wt %.

2. The dehydration method according to claim 1, wherein in the multi-step process, a concentration of concentrated sulfuric acid used in a most downstream dehydration step is a highest concentration, as compared with the concentrations of the concentrated sulfuric acids used in dehydration steps upstream from the most downstream dehydration step.

3. The dehydration method according to claim 1, further comprising:
   a step of removing sulfuric acid mist from hydrogen chloride gas that has been obtained through the multi-step process, by using a mist separator provided with a glass filter.

4. A method for producing trichlorosilane by reacting hydrogen chloride gas with water content that has been reduced by a dehydration method according to claim 1 with metallic silicon.

* * * * *